US008565174B2

(12) United States Patent  
Zhou et al.

(10) Patent No.: US 8,565,174 B2
(45) Date of Patent: Oct. 22, 2013

(54) RESOURCE MANAGEMENT METHOD, APPARATUS AND SYSTEM IN A MULTI-CARRIER SYSTEM

(75) Inventors: Zheng Zhou, Shenzhen (CN); Yi Zhang, Shenzhen (CN); Jinlin Zhang, Shenzhen (CN); Jie Ma, Shenzhen (CN); Xijun Xue, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 217 days.

(21) Appl. No.: 13/030,917

(22) Filed: Feb. 18, 2011

(65) Prior Publication Data

US 2011/0149781 A1 Jun. 23, 2011

Related U.S. Application Data

(63) Continuation of application No. PCT/CN2009/073346, filed on Aug. 19, 2009.

(30) Foreign Application Priority Data

Aug. 19, 2008 (CN) .......................... 2008 1 0145768

(51) Int. Cl.
*G01R 31/08* (2006.01)
*H04B 7/212* (2006.01)
*H04J 3/16* (2006.01)

(52) U.S. Cl.
USPC ............ 370/329; 370/252; 370/348; 370/437

(58) Field of Classification Search
USPC .................. 370/252, 254, 278, 282, 329, 337, 370/347–348, 431–433, 437, 443
See application file for complete search history.

(56) References Cited

U.S. PATENT DOCUMENTS 6,069,871 A * 5/2000 Sharma et al. ................ 370/209
6,704,572 B1   3/2004 Whinnett et al.
(Continued)

FOREIGN PATENT DOCUMENTS

CN      1341336 A     3/2002
CN      1728863 A     2/2006
(Continued)

OTHER PUBLICATIONS

Written Opinion of the International Searching Authority issued in corresponding PCT Patent Application No. PCT/CN2009/073346, mailed Dec. 3, 2009.

(Continued)

*Primary Examiner* — Redentor Pasia
(74) *Attorney, Agent, or Firm* — Brinks Hofer Gilson & Lione

(57) ABSTRACT

The present invention relates to the field of communications technologies. A resource management method, apparatus, and system in a multi-carrier system are disclosed. The multi-carrier system includes at least one multi-carrier cell and the multi-carrier cell includes at least two single carrier establishing cooperation. The method includes the following steps: A base station measures the cooperative resource usage information of each cooperation established single carrier cell; the base station reports the cooperative resource usage information to a radio network controller for the radio network controller to perform resource management. The information measured and reported by the base station in the embodiment of the present invention can satisfy the needs of the multi-carrier performing resource management and make sure that the radio network controller can perform reasonable admission control over multi-carrier UEs.

12 Claims, 3 Drawing Sheets

(56) References Cited

U.S. PATENT DOCUMENTS

| | | |
|---|---|---|
| 8,102,834 B2 | 1/2012 | Chen et al. |
| 2004/0176097 A1* | 9/2004 | Wilson et al. ............... 455/452.2 |
| 2008/0075119 A1* | 3/2008 | Zhang et al. .................. 370/503 |
| 2008/0259863 A1* | 10/2008 | Zhang et al. .................. 370/329 |
| 2008/0287137 A1* | 11/2008 | Li et al. .......................... 455/450 |
| 2008/0299985 A1* | 12/2008 | Yang et al. ................. 455/452.2 |
| 2009/0003288 A1* | 1/2009 | Chen et al. .................... 370/336 |
| 2009/0116468 A1* | 5/2009 | Zhang et al. .................. 370/342 |
| 2011/0116406 A1* | 5/2011 | Racz et al. .................... 370/252 |

FOREIGN PATENT DOCUMENTS

| | | |
|---|---|---|
| CN | 1780170 A | 5/2006 |
| CN | 1784033 A | 6/2006 |
| CN | 1941989 A | 4/2007 |
| CN | 100569016 C | 12/2009 |
| WO | WO 2006005240 A1 | 1/2006 |
| WO | WO 2007/092517 A2 | 8/2007 |

OTHER PUBLICATIONS

Office Action issued in corresponding Chinese Patent Application No. 200810145768.2, mailed Jun. 24, 2011.

International Search Report issued in corresponding PCT Application No. PCT/CN2009/073346; mailed Dec. 3, 2009.

Office Action issued in corresponding Chinese Patent Application No. 200810145768.2, mailed Apr. 28, 2012.

Office Action issued in corresponding Chinese Patent Application No. 200810145768.2, mailed Dec. 5, 2012.

Office Action issued in corresponding Chinese Patent Application No. 200810145768.2, mailed Jun. 5, 2013, 15 pages.

\* cited by examiner

US 8,565,174 B2

RESOURCE MANAGEMENT METHOD, APPARATUS AND SYSTEM IN A MULTI-CARRIER SYSTEM

CROSS-REFERENCE TO RELATED APPLICATIONS

This application is a continuation of International Application No. PCT/CN2009/073346, filed on Aug. 19, 2009, which claims priority to Chinese Patent Application No. 200810145768.2, filed on Aug. 19, 2008, both of which are hereby incorporated by reference in their entireties.

FIELD OF THE INVENTION

The present invention relates to the field of communications technologies, and in particular, to a resource management method, apparatus, and system in a multi-carrier system.

BACKGROUND OF THE INVENTION

In existing Universal Mobile Telecommunications System (UMTS) including an evolving High Speed Packet Access (HSPA) system, cells where User Equipments (UEs) reside are all single carrier cells. A single carrier cell works with only one carrier frequency. UEs in the cell support High Speed Downlink Packet Access (HSDPA).

To enable current systems to provide services of higher rate for UEs, multi-carrier HSPA technology emerges.

In the following manner, multi-carrier HSPA can break the limit that currently one cell work with only one carrier frequency.

UEs realize data transmission with multi-carriers by cooperation between at least two single carrier cells. Thus, a UE supporting multi-carriers can concurrently establish connections with multiple single carrier cells, each connection between the UE and a single carrier cell being able to send different data. The main carrier cell is a single carrier cell providing broadcast channels (also known as control channels) for UEs.

In a single carrier system, in order to ensure the stability of the system, a UE need to go through an admission process before accessing the network. This is to make sure that the remaining resources (including power resources, downlink codes, etc) can meet the minimum requirements of the UE. Therefore, Radio Network Controller (RNC) needs to acquire the usage information of downlink resources in the single carrier cell where the UE resides, and performs admission control according to the information.

The inventors find that this prior art has the following drawbacks:

After introducing the multi-carrier HSPA technology, the cell in which the UE resides becomes a multi-carrier cell, which includes at least two cooperation established single carrier cells with each other. Similar to the situation where the cell in which the UE resides is a single carrier cell, the RNC needs to acquire the usage information of downlink resources in the multi-carrier cell where the UE resides, and performs admission control according to the information. However, current reporting methods for single carrier system cannot meet the demand of multi-carrier system performing resource management.

SUMMARY OF THE INVENTION

Embodiments of the present invention provide a resource management method, apparatus, and system in a multi-carrier system, to enable the multi-carrier system to perform resource management according to resource usage information of the multi-carrier cell.

To achieve the above objective, the embodiments of the present invention adopt the following technical solutions.

A resource management method in a multi-carrier system is provided in the present invention. The multi-carrier system includes at least one multi-carrier cell which includes at least two cooperation established single carrier cells with each other. The method includes:

measuring, by a base station, cooperative resource usage of each single carrier cell establishing the cooperation; and reporting, by the base station, the cooperative resource usage to a radio network controller (RNC) for resource management.

A base station, including:

a cooperative resource measuring module, adapted to measure cooperative resource usage of each cooperation established single carrier cell; and a reporting module, adapted to report the cooperative resource usage of all cooperation established single carrier cells measured by the cooperative resource measuring module.

A resource management system in a multi-carrier system is provided in the present invention. The multi-carrier system includes at least one multi-carrier cell which includes at least two cooperation established single carrier cells with each other. The resource management system includes:

a base station, adapted to measure cooperative resource usage of each single carrier cell establishing the cooperation, and report the cooperative resource usage to an RNC for resource management.

With the resource management method, apparatus, and system provided by the embodiments of the present invention, the cooperative resource usage of all cooperation established single carrier cells are measured and reported by a base station. The RNC can perform reasonable admission control over multi-carrier UEs according to reported information provided by the embodiments of the present invention, thereby meeting the requirements of the multi-carrier system performing resource management.

DETAILED DESCRIPTION OF THE EMBODIMENTS

For the scenario where the cell in which a UE resides is a multi-carrier cell, a multi-carrier cell includes at least two cooperation established single carrier cells with each other, and usually the downlink resources of the single carrier cells will not be completely used for cooperation. The resources in a single carrier cell include cooperative resources for providing services to the multi-carrier UEs and non-cooperative resources mainly for providing services to the single carrier UEs residing in the cell. Therefore, the RNC needs to acquire usage information of the cooperative resources in each cooperation established single carrier cell to perform reasonable admission control over multi-carrier UEs and to perform resource management.

To solve the problem of current reported information failing to meet the requirements that the multi-carrier system performs admission control over multi-carrier UEs and performs resource management, the embodiments of the present invention provide a resource management method and system in a multi-carrier system, where the multi-carrier system includes at least one multi-carrier cell and the multi-carrier cell includes at least two cooperation established single carrier cells with each other.

In the following, the resource management method and system in the multi-carrier system of the embodiments of the present invention are described in detail with reference to the accompanying drawings.

Embodiment 1

Figure 1:
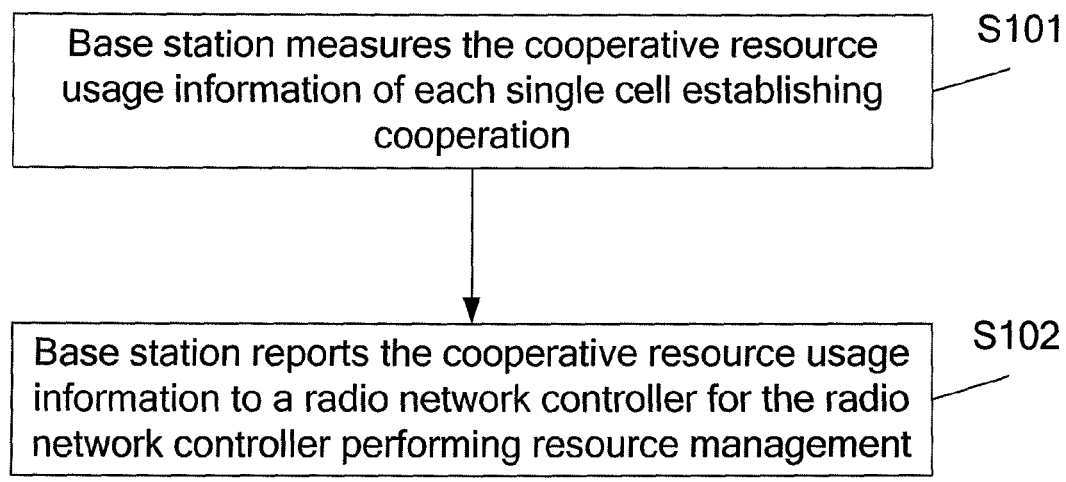
FIG. 1 is a flow schematic diagram of the resource management method in a multi-carrier system according to Embodiment 1 of the present invention.

A resource management method in a multi-carrier system, as shown in FIG. 1, includes the following steps:

Step S101: A base station measures the cooperative resource usage of each cooperation established single carrier cell.

Step S102: The base station reports the cooperative resource usage to an RNC for resource management.

In this case, the base station may be a Node B. Taking Node B as an example, the cooperative resource usage of a single carrier cell usually includes one or more types of the following information: cooperative resource usage of power required by High Speed Downlink Shared Channel (HS-DSCH), where the HS-DSCH is a channel added to UMTS for increase of downlink data rate and a transmission channel shared by all UEs; cooperative resource usage of Transmitted Carrier Power (TCP); and cooperative resource usage of Provided Bit Rate (PBR).

In step S101, measuring, by Node B, the cooperative resource usage of each single carrier cell includes two modes.

In the first mode, Node B measures the cooperative resource usage of all multi-carrier UEs of each single carrier cell.

In the second mode, Node B respectively measures the cooperative resource usage of all multi-carrier UEs corresponding to each Scheduling Priority Indicator (SPI) and having the identical SPI in each single carrier cell. That is, for each SPI, all multi-carrier UEs with identical SPI are classified into a class and all cooperative resource usages of each class of multi-carrier UEs are respectively measured.

Node B can periodically perform measurement and report the measurement results to an RNC. The measurement and report may be performed in the manner of event triggering, and may also be performed according to the needs of the RNC. When Node B performs measurement and reporting according to the needs of the RNC, before step S101, the following steps may also be included:

The RNC adds a cooperative resource usage measurement type to COMMON MEASUREMENT INITIATION REQUEST. For example, the RNC adds one of the following types to Common Measurement Type: Transmitted Carrier Power for cell cooperation, or HS-DSCH Provided Bit Rate for cell cooperation, or HS-DSCH Required Power for cell cooperation. Then, the RNC sends the COMMON MEASUREMENT INITIATION REQUEST to the Node B.

The RNC usually needs to manage resources of the multi-carrier cell according to at least one of the following information: cooperative resource usage and non-cooperative resource usage of each single carrier cell in the multi-carrier cell, and the number of all UEs and the number of multi-carrier UEs on the carriers of each single carrier cell. The executable resource management includes but is not limited to: performing admission control over single carrier or multi-carrier UEs or reconfiguring the resources of the single carrier cells. Therefore, at the same time of executing step S101, namely, Node B measures cooperative resource usage of each single carrier cell, Node B may further:

measure and report non-cooperative resource usage of each single carrier cell; and/or measure and report the number of all UEs and the number of multi-carrier UEs on the carriers of each single carrier cell.

Corresponding to measuring, by Node B cooperative resource usage of each single carrier cell in two modes, Node B measures and reports non-cooperative resource usage in another two modes.

In the first mode, Node B measures and reports resource usage of all single carrier UEs of each single carrier cell.

In the second mode, Node B measures and reports resource usage of all single carrier UEs corresponding to each SPI and having the identical SPI in each single carrier cell. That is, for each SPI, Node B classifies all single carrier UEs with identical SPI into a class and respectively measures all resource usages of each class of single carrier UEs.

In the present embodiment, there are two ways for determining which resources belong to cell cooperative resources. One way is to determine that resources of auxiliary carriers of all multi-carrier HSDPA UEs within the cell are cell cooperative resources; the other way is to determine that resources of both main and auxiliary carriers of the HSDPA UEs are cell cooperative resources. That is, in the multi-carrier cell, the main carrier resources of the single carrier cell in which public broadcast resides can be classified as cooperative resources or non-cooperative resources. When the main carrier resources belong to non-cooperative resources, the non-cooperative resource usage information of the single carrier cell further includes usage information of the main carrier resources.

According to the present embodiment, the cooperative resource usage of all cooperation established single carrier cells in the multi-carrier cell is measured and reported via a Node B. Compared with the prior art where the Node B only measures and reports usage of the downlink resources of the single carrier cell in which the UEs reside, in this embodiment, the RNC can perform reasonable admission control according to the cooperative resource usage of all single carrier cells establishing the cooperation, and satisfy the requirement of the multi-carrier system performing resource management. The admission control belongs to resource management. According to the information reported by the Node B, the RNC can further perform other resource management operations, for example, reconfiguring the single carrier cells' resources.

Embodiment 2

Figure 2:
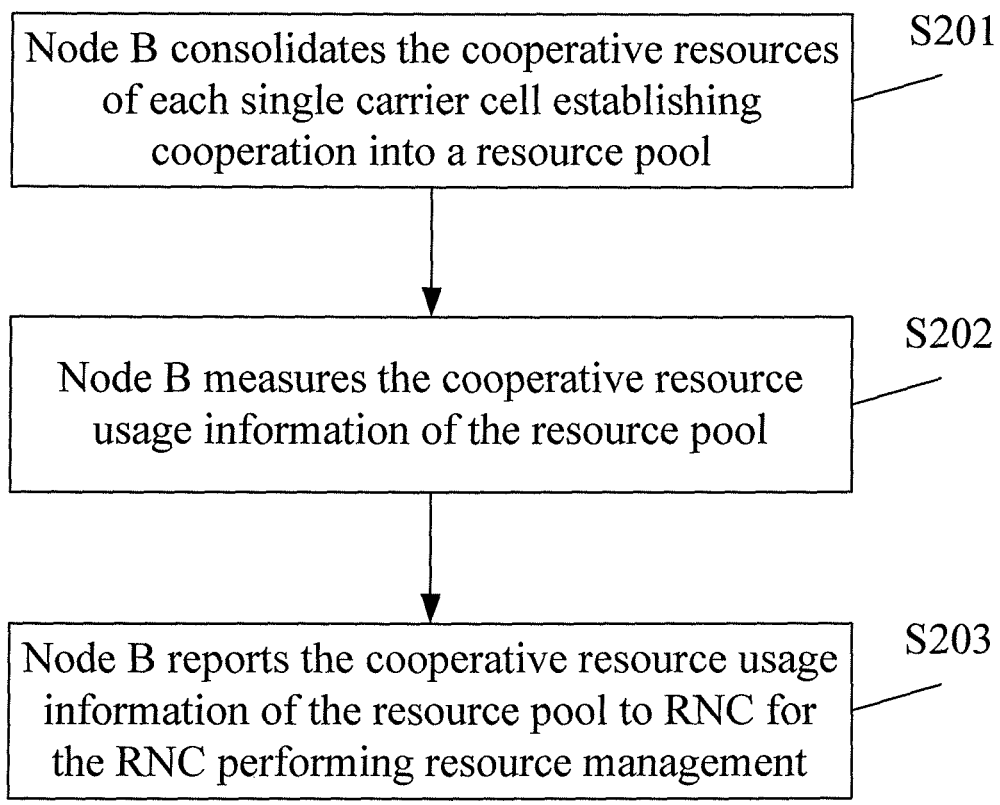
FIG. 2 is a flow schematic diagram of the resource management method in a multi-carrier system according to Embodiment 2 of the present invention.

A resource management method in a multi-carrier system, as shown in FIG. 2, includes the following steps:

Step S201: A Node B consolidates the cooperative resources of each cooperation established single carrier cell into a resource pool.

Step S202: The Node B measures the cooperative resource usage of the resource pool.

The way of measurement can be: measuring cooperative resource usage of all multi-carrier UEs in the resource pool, or respectively measuring the cooperative resource usage of all multi-carrier UEs corresponding to each SPI and having the identical SPI in the resource pool.

Step S203: The Node B reports the cooperative resource usage information of the resource pool to an RNC for resource management.

The present embodiment uses the above step S201 and step S202 to enable Node B to measure cooperative resource usage of each single carrier cell in step S101 of Embodiment 1. The basis for this approach is as follows: The cooperative resources between the single carrier cells establishing cooperation are shared by the multi-carrier UEs in the multi-carrier cell. Therefore, usually the need of the multi-carrier system performing resource management can be satisfied without specifically distinguishing usage of the overall cooperative resources of each single carrier cell.

In this case, the two modes in which the Node B measures and reports the cooperative resource usage of the resource pool and the two modes in which the cooperative resources are classified are identical with those of Embodiment 1 and hence description thereof is omitted.

According to the present embodiment, the cooperative resource usage of the resource pool is measured and reported via a Node B. Compared with the prior art where the Node B only measures and reports usage of downlink resources of the single carrier cell in which the UEs reside, in this embodiment, the RNC can perform reasonable admission control according to the cooperative resource usage information of the resource pool, and satisfy the requirement of the multi-carrier system performing resource management.

Embodiment 3

Figure 3:
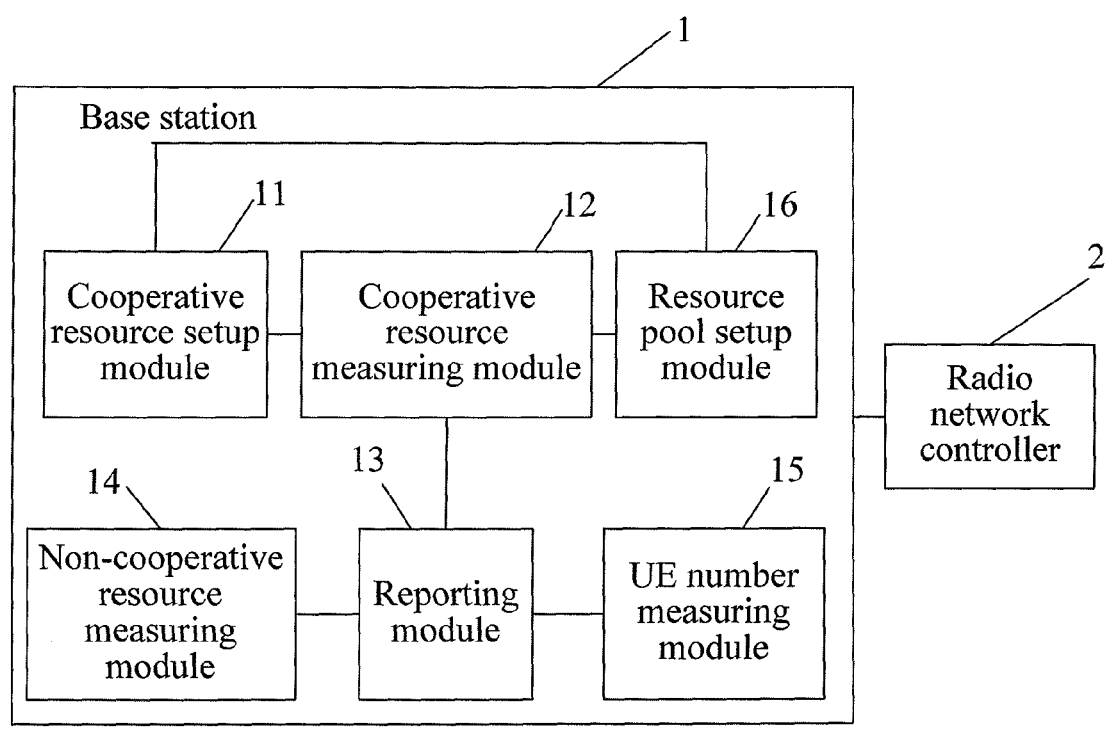
FIG. 3 is an architecture schematic diagram of the resource management system and apparatus in a multi-carrier system according to Embodiment 3 of the present invention.

To solve the problem that current reported information fails to meet the requirements that the multi-carrier system performs admission control over multi-carrier UEs and performs resource management, the embodiments of the present invention provide a resource management system and apparatus in a multi-carrier system, where the multi-carrier system includes at least one multi-carrier cell and the multi-carrier cell includes at least two cooperation established single carrier cells with each other. As shown in FIG. 3, the resource management system includes:

a base station 1, adapted to measure the cooperative resource usage of each cooperation established single carrier cell and report the cooperative resource usage information to an RNC 2 for resource management, where the base station 1 may be a Node B.

The base station 1 includes:

a cooperative resource setup module 11, adapted to set up a multi-carrier cell and configure the cooperative resources of each single carrier cell in the multi-carrier cell, where the cooperative resources can be resources of all multi-carrier HSDPA UEs's auxiliary carriers in the cell or a sum of the resources of the multi-carrier HSDPA UEs' main and auxiliary carriers;

a cooperative resource measuring module 12, adapted to measure the cooperative resource usage of each cooperation established single carrier cell; and a reporting module 13, adapted to report to the RNC 2 the cooperative resource usage information of each cooperation established single carrier cell measured by the cooperative resource measuring module 12.

The RNC 2 usually needs to perform resource management or admission control, on at least one single carrier or multi-carrier UE within the multi-carrier cell according to: cooperative resource usage information and non-cooperative resource usage information of each single carrier cell in the multi-carrier cell, and the number of all UEs and the number of multi-carrier UEs on the carriers of each single carrier cell, such admission control may include reconfiguration of resources of the single carrier cells. Therefore, the base station 1 may further includes:

a non-cooperative resource measuring module 14, adapted to measure the non-cooperative resource usage of the cooperation established single carrier cell; in the multi-carrier cell, when the main carrier resources of the public broadcast belong to non-cooperative resources, the non-cooperation resource usage information of the single carrier cell includes the main carrier resource usage information in addition to the resource usage information of the single carrier UEs.

In this case, the non-cooperative resource usage measured by the non-cooperative resource measuring module 14 can be reported to the RNC 2 via the reporting module 13.

The base station 1 may further include a UE number measuring module 15, adapted to measure the number of all UEs and the number of the multi-carrier UEs on the carriers of the single carrier cells.

In this case, the number of all UEs and the number of the multi-carrier UEs measured by the UE number measuring module 15 can be reported to the RNC 2 via the reporting module 13.

The cooperative resources between the single carrier cells establishing cooperation are shared by the multi-carrier UEs in the multi-carrier cell, the cooperative resources of all single carrier cells in the multi-carrier cell can be consolidated into a resource pool, and the usage information of the resource pool can satisfy the resource management needs of the multi-carrier system. Therefore, the base station 1 may further include:

a resource pool setup module 16, adapted to consolidate the cooperative resources of all cooperation established single carrier cells in the multi-carrier cell and configured by the cooperative resource setup module 11 into a resource pool, where the cooperative resource measuring module 12 is further adapted to measure the usage of the resource pool created by the resource pool setup module 16.

Corresponding to Embodiment 1 and Embodiment 2, there are also two modes in which the base station 1 measures and reports the non-cooperative resource usage information.

In the first mode, the base station 1 measures and reports the resource usage information of all single carrier UEs of each single carrier cell.

In the second mode, the base station 1 measures and reports the resource usage information of all single carrier UEs with identical SPI and corresponding to each SPI in each single carrier cell.

With the resource management method, apparatus, and system provided in this embodiment, the cooperative resource usage information of all cooperation established single carrier cells in the multi-carrier cell is measured and reported via the base station 1. Compared with the prior art where only usage of downlink resources of the single carrier cell in which the UEs reside is measured and reported, the RNC 2 can perform reasonable admission control over the multi-carrier UEs according to the reported information provided by the present embodiment, and satisfy the requirement of the multi-carrier system performing resource management.

The above are some specific embodiments of the present invention. The protection scope of the present invention is not limited by these embodiments. Those modifications or replacement easily conceivable to any person skilled in the art and within the technical scope disclosed by the present inven-

What is claimed is:

1. A resource management method in a multi-carrier system, wherein the multi-carrier system comprises at least one multi-carrier cell, the at least one multi-carrier cell comprises at least two cooperation established single carrier cells, and the method comprising:
   measuring by a base station, cooperative resource usage of all multi-carrier user equipments (UEs) corresponding to an identical Scheduling Priority Indicator (SPI) in each of the at least two cooperation established single carrier cells or in a resource pool, wherein the cooperative resource usage is indicative of usage and services provided to the all multi-carrier UEs in each of the at least two cooperation established single carrier cells, and if main carrier resources of a single carrier cell belong to non-cooperative resources, usage of the non-cooperative resource comprises usage of the main carrier resources; and
   reporting by the base station, the cooperative resource usage in each of the at least two cooperation established single carrier cells to a radio network controller (RNC) for performing resource management on each of the at least two cooperation established single carrier cells.

2. The resource management method according to claim 1, before the measuring by the base station, the method further comprising:
   combining the cooperative resources in each of the at least two cooperation established single carrier cells into the resource pool;
   wherein the measuring comprising measuring the cooperative resource usage of the resource pool.

3. The resource management method according to claim 1, further comprising:
   measuring and reporting by the base station, the usage of the non-cooperative resources of each of the at least two cooperation established single carrier cells for the RNC to perform resource management.

4. The resource management method according to claim 1, wherein the usage of the non-cooperative resources comprises:
   resource usage of all single carrier UEs corresponding to the identical SPI in each of the at least two cooperation established single carrier cells.

5. The resource management method according to claim 1, wherein: the measuring of the cooperative resource usage of each single carrier cell, comprises:
   measuring and reporting by the base station, a number of all UEs and a number of multi-carrier UEs on a carrier of each of the at least two cooperation established single carrier cells.

6. The resource management method according to claim 1, wherein the performing of resource management comprises:
   performing by the RNC, admission control over the single carrier UEs or the multi-carrier UEs in the multi-carrier cell, or reconfiguring resources of the at least two cooperation established single carrier cells according to: the cooperative resource usage and the usage of the non-cooperative resources usages of each single carrier cell, and a number of all the UEs and a number of the multi-carrier UEs on carriers of each single carrier cell.

7. A base station in a multi-carrier system, wherein the multi-carrier system comprises at least two cooperation established single carrier cells, the base station comprises:
   a cooperative resource measuring module, configured to measure cooperative resource usage of all multi-carrier user equipments (UEs) corresponding to an identical Scheduling Priority Indicator (SPI) in each of the at least two cooperation established single carrier cells or in a resource pool, wherein the cooperative resource usage is indicative of usage and services provided to the all multi-carrier UEs in each of the at least two cooperation established single carrier cells, and if main carrier resources of a single carrier cell belong to non-cooperative resources, usage of the non-cooperative resource comprises usage of the main carrier resources; and
   a reporting module, configured to report to a radio network controller (RNC), the measured cooperative resource usage is utilized by the RNC for performing resource management to each of the at least two cooperation established single carrier cells.

8. The base station according to claim 7, further comprises:
   a cooperative resource setup module, configured to set up the multi-carrier cell and configure the cooperative resources of each of the at least two single cooperation established carrier cells in the multi- carrier cell.

9. The base station according to claim 8, further comprises:
   a resource pool setup module, configured to consolidate the cooperative resources of the at least two cooperation established single carrier cells into the resource pool; and
   the cooperative resource measuring module, configured to measure the cooperative resource usage of the resource pool established by the resource pool setup module.

10. The base station according to claim 7, further comprises:
    a non-cooperative resource measuring module, configured to measure the usage of the non-cooperative resource in each of the at least two cooperation established single carrier cells;
    the reporting module, further configured to report the usage of the non-cooperative resource measured by the non-cooperative resource measuring module to the radio network controller (RNC).

11. The base station according to claim 7, further comprises:
    a user equipment (UE) number measuring module, configured to measure a number of all UEs and a number of multi-carrier UEs on each of the at least two cooperation established single carrier cells; and
    the reporting module, further configured to report the number of all the UEs and the number of the multi-carrier UEs measured by the UE number measuring module to the RNC.

12. A resource management system in a multi-carrier system, wherein the multi-carrier system comprises at least one multi-carrier cell, the multi-carrier cell comprises at least two cooperation established single carrier cells, resources in the single carrier cell include cooperative resources for providing services to a multi-carrier user equipment (UE) and non-cooperative resources for providing services to a single carrier UE residing in the single carrier cell, and the resource management system comprises:
    a base station, configured to:
        measure cooperative resource usage of all multi-carrier user equipments (UEs) corresponding to an identical Scheduling Priority Indicator (SPI) in each of the at least two cooperation established single carrier cells or in a resource pool, wherein the cooperative resource usage is indicative of usage and services provided to the all multi-carrier UEs in each of the at least two cooperation established single carrier cells, and if main carrier resources of a single carrier cell belong to non-cooperative resources, usage of the non-cooperative resource comprises usage of the main carrier resources; and report the cooperative resource usage to a radio network controller (RNC) for performing resource management to each of the at least two cooperation established single carrier cells.

* * * * *